United States Patent
Szymanski

(10) Patent No.: US 7,325,483 B2
(45) Date of Patent: Feb. 5, 2008

(54) AUTOMATED BELT COOKING MACHINE PANCAKES OR THE LIKE

(76) Inventor: Marek Szymanski, P.O. Box 408, Kellyville, New South Wales, 2155 (AU)

( * ) Notice: Subject to any disclaimer, the term of this patent is extended or adjusted under 35 U.S.C. 154(b) by 0 days.

(21) Appl. No.: 10/495,811

(22) PCT Filed: Nov. 19, 2002

(86) PCT No.: PCT/AU02/01563

§ 371 (c)(1), (2), (4) Date: May 12, 2004

(87) PCT Pub. No.: WO03/043424

PCT Pub. Date: May 30, 2003

(65) Prior Publication Data

US 2005/0072311 A1    Apr. 7, 2005

(30) Foreign Application Priority Data

Nov. 19, 2001   (AU) .............................. 2002951675

(51) Int. Cl.
*A47J 37/00* (2006.01)

(52) U.S. Cl. .............................. 99/349; 99/373; 99/386; 99/443 C

(58) Field of Classification Search .......... 99/349–351, 99/352–355, 372, 373, 386, 423, 443 C, 99/443 R, 427, 444–450, 477–479; 198/813, 198/626.5; 219/388; 426/523
See application file for complete search history.

(56) References Cited

U.S. PATENT DOCUMENTS 2,907,450 A * 10/1959 Reid ..................... 198/810.04
3,065,079 A * 11/1962 Elliott ........................ 426/296
3,170,564 A *  2/1965 Gatto ....................... 198/626.5
3,329,561 A *  7/1967 Rojecki et al. ............. 162/273
3,474,893 A * 10/1969 Morine ....................... 198/300
3,528,361 A *  9/1970 Le Van ........................ 99/349

(Continued)

FOREIGN PATENT DOCUMENTS

DE    3036331    5/1982

(Continued)

*Primary Examiner*—Timothy F. Simone
(74) *Attorney, Agent, or Firm*—Birch, Stewart, Kolasch & Birch, LLP

(57) ABSTRACT

An automated belt cooking machine (10) for pancakes and the like food products has upper and lower overlapping, thermally conductive belts (12, 14), counter-rotatably mounted to a frame (16) so that, in use, a bottom run (30) of the upper belt (12) and a top run (32) of the lower belt (14) co-operate to convey food (40) to be cooked. The lower belt (14) extends a predetermined distance to one side of the upper belt (12) so as to provide a dispensing platform portion (38) for dispensing thereon the food to be cooked (40), so that the food (40) is conveyed towards a mouth (52) formed between the upper belt and lower belts (12, 14) and thereafter is conveyed sandwiched between the bottom and top run (30, 32). Upper and lower heating platens (26,28) are mounted to the frame (16) and are in thermal contact with the bottom and top run (30, 32), wherein the food to be cooked (40) is initially exposed to heat from the lower platen (28) conducted through the dispensing platform portion (38).

10 Claims, 5 Drawing Sheets

U.S. PATENT DOCUMENTS

| | | | |
|---|---|---|---|
| 3,581,652 A | * | 6/1971 | Chauvin ................... 99/334 |
| 3,646,880 A | * | 3/1972 | Norris ..................... 99/349 |
| 4,197,792 A | * | 4/1980 | Mendoza ................. 99/349 |
| 4,938,126 A | * | 7/1990 | Rubio et al. ............. 99/349 |
| 5,044,264 A | * | 9/1991 | Forney .................... 99/349 |
| 5,088,391 A | * | 2/1992 | Anderson ................ 99/423 |
| 5,160,377 A | * | 11/1992 | Montemayor et al. .... 118/13 |
| 5,261,257 A | * | 11/1993 | Collier ..................... 70/456 R |
| 5,458,051 A | | 10/1995 | Alden et al. ............. 99/349 |

FOREIGN PATENT DOCUMENTS

| | | |
|---|---|---|
| WO | WO9503713 | 2/1995 |
| WO | WO 96/16584 A1 | 6/1996 |

* cited by examiner

AUTOMATED BELT COOKING MACHINE PANCAKES OR THE LIKE

FIELD OF THE INVENTION

The present invention relates to an automated belt cooking machine for pancakes or the like food products. In particular, the present invention relates to an improved machine for cooking pancakes by dispensing a liquid batter onto a movable thermally conductive belt and bringing the liquid batter into thermal contact with upper and lower electrically heated platens or hot plates. More particularly, the present invention relates to such an improved machine having a pair of overlapping, counter-rotating, thermally conductive belts in which the liquid batter is deposited onto a lower or underlying belt in thermal contact with a lower platen and then conveyed in the direction of an upper or overlying belt in thermal contact with an upper platen so that the batter enters the mouth between the counter-rotating belts with its bottom surface first exposed to heating before its top surface, thereby assisting in the release of gases trapped in bubbles produced by heating the batter before the batter becomes sandwiched between the belts, thus avoiding disrupting the structure of the cooked pancake.

BACKGROUND ART

Automated belt cooking machines have been used in the prior art to cook certain food products, such as pancakes, meat patties, and fillets of fish and chicken. The prior art includes single belt cooking machines, particularly of the bar type or open mesh conveyor type, series belt cooking machines, and overlapping belt cooking machines. Single belt cooking machines, though commonplace, are illsuited for cooking food products that require the application of heat to the top and bottom of the food to be cooked.

Where such attempts have been made with single belt cooking machines utilizing overlapping platens to heat the top and bottom of the food along the run of the belt, as in U.S. Pat. No. 3,965,807 and U.S. Pat. No. 3,739,711, a single conveyor pushes the food to be cooked over a lower platen and under an upper platen so that direct thermal contact between the platens and the food is achieved. However, where the food to be cooked consists of, or includes, a bubble forming substance, such as batter, bubbles are formed between the platens and the gases trapped therewithin are prevented from being released peacefully from the top of the food being cooked by pressure exerted against the expanding food by the upper platen. Instead the gases are likely to be released violently from the sides or bottom of the food being cooked, lending to a disrupted structure of the cooked food. Furthermore, the direct contact between the platens and the food and the likely bursting of bubbles requires that the platens be cleaned regularly, meaning that the machinery will suffer down-time resulting in lost productivity during a cool down and cleaning period. Also, the open structure of the single conveyor used in the above patents means that the food is likely to break up or become embedded in the open structure, therefore requiring cleaning of the conveyor and surrounding structures to remove the baked on fragments of the food.

Where attempts have been made with series belt cooking machines to cook food products that require the application of heat to the top and bottom of the food to be cooked, as in U.S. Pat. No. 4,667,589 and No. 5,077,072 the food is initially cooked on an underside as it passes on an upper conveyor and is then flipped onto a lower conveyor wherein it is cooked on the opposite side, optionally followed by flattening the cooked food by sandwiching between belts. As such attempts require at least two flights of conveyors and a flipping manoeuvre to transfer the food from one conveyor to another, the machinery needed to achieve the desired cooked food product is more complicated and prone to failure than overlapping belt cooking machines.

Where attempts have been made with overlapping belt cooking machines to cook food products that require the application of heat to the top and bottom of the food to be cooked, as in U.S. Pat. No. 5,044,264 and U.S. Pat. No. 5,458,051, a pair of opposed, counter-rotating belts, particularly of the Teflon coated over fibreglass fabric type, convey the food between heated upper and lower platens which are in thermal contact with the portions of the upper and lower belts respectively that make contact with the food, so that heat generated by the platens is conducted through the belts and into the top and bottom of the food to be cooked. However, the superimposed location of the upper and lower platens is such that the food to be cooked is exposed to heat conducted through both the upper and lower belts simultaneously, and the parallel disposition of the upper and lower platens is such that no allowance is made for the usual increase in thickness of the food as it is being cooked between the platens. The simultaneous application of heat to the top and bottom surfaces of the food whilst the food is sandwiched and conveyed between the counter-rotating belts does not allow, it is assumed, for the gradual and peaceful release of gases trapped in bubbles formed on the surface of the food, particularly from the top of the food, causing disruption of the interior and surface structure of the food product as the bubbles burst out of the sides of the food.

It is an object of the present invention to overcome, or at least substantially ameliorate, the disadvantages and shortcomings of the prior art.

SUMMARY OF INVENTION

According to the present invention, there is provided an automated belt cooking machine for pancakes and the like food products comprising upper and lower overlapping, thermally conductive belts, said belts being counter-rotatably mounted to a frame for said machine so that, in use, a bottom run of said upper belt and a top run of said lower belt co-operate to convey food to be cooked into said food products between said upper and lower belts, said lower belt extending a predetermined distance to one side of said upper belt so as to provide a dispensing platform portion of said top run of said lower belt for dispensing thereon said food to be cooked, so that, in use, said food is conveyed in a direction towards a mouth formed between said bottom run of the upper belt and said top run of the lower belt to receive said food and thereafter is conveyed sandwiched between said bottom run and said top run to a downstream end of said lower belt, upper and lower heating platens mounted to said frame and in thermal contact with said bottom run of the upper belt and said top run of the lower belt, respectively, wherein said food to be cooked is initially exposed to heat from said lower platen conducted firstly through said dispensing platform portion of said top run and then continually through the remaining portion of said top run toward said mouth so as to assist in the release of gases trapped in bubbles produced by heating said food before said food is sandwiched between said bottom run and said top run, and wherein said food to be cooked is then exposed to heat from said upper platen conducted through said bottom run as well as from said lower platen conducted through said top run so as to cook said food products.

It is also preferred that said machine includes a dispensing apparatus for said food having a dispensing outlet located substantially over said dispensing platform portion.

In a further preferred form, said bottom run of the upper belt and said top run of the lower belt converge towards said mouth formed between said bottom and top runs to receive said food.

Still further, said upper platen is pivotally mounted to said frame so as to allow for adjustment or variation in the distance between said lower and upper platens to accommodate different thicknesses and expansion of said food being cooked. The upper platen may be pivotally mounted adjacent said mouth and may be subject to a pivotal bias for retaining a predetermined distance between said lower and upper platens provided by a spring means.

Preferably, said machine includes an antiroller mounted to said frame adjacent said downstream end of said lower belt, said antiroller and said lower belt being adapted to rotate in the same direction so that, in use, said food products are peeled off said lower belt by the rotation of said antiroller. A similar antiroller arrangement is preferably mounted adjacent the downstream end of said upper belt.

BRIEF DESCRIPTION OF THE DRAWINGS

In order that the invention may be readily understood and put into practical effect, reference will now be made to the accompanying drawings, in which:—

BEST MODES FOR CARRYING OUT THE INVENTION

Figure 1:
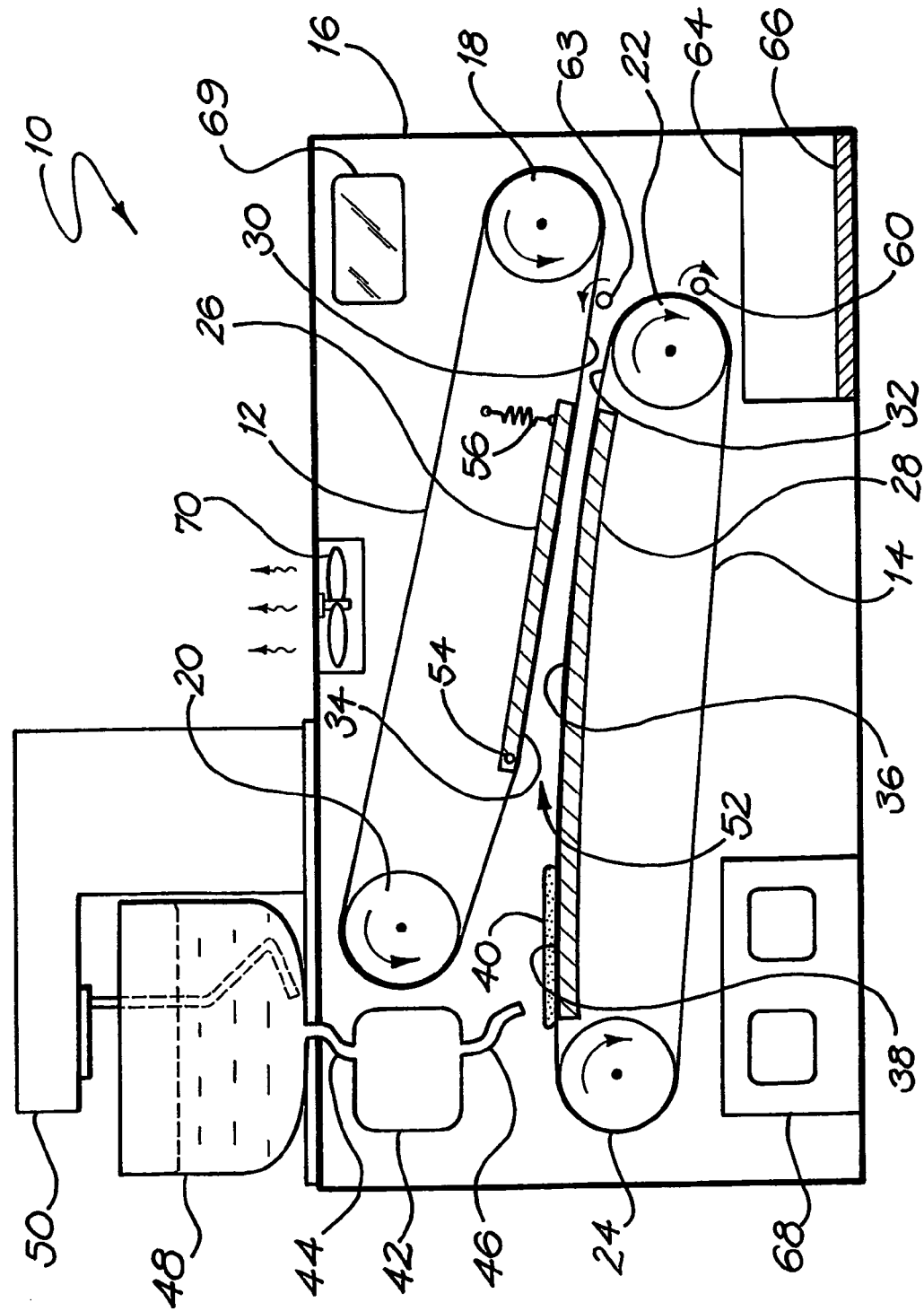
FIG. 1 is a schematic front view of an automated belt cooking machine according to a first preferred embodiment of the present invention.

The automated belt cooking machine 10 shown in FIG. 1 includes an upper belt 12 and a lower belt 14 mounted to a frame 16. The upper belt 12 is rotated in an anticlockwise direction over motor driven roller 18 and idler roller 20, and the lower belt 14 is rotated in a clockwise direction over motor driven roller 22 and idler roller 24. The upper and lower belts 12, 14 are, in this embodiment, fabricated of a thin fibreglass fabric coated with Teflon, to provide sufficient flexibility, high temperature resistance, thermal conductance, and non-stick characteristics to releasably support and cook most foods.

The upper belt 12 surrounds an upper heating platen 26, and the lower belt 14 surrounds a lower heating platen 28, the platens 26, 28 being heated electrically in this embodiment. The platens 26, 28 are in thermal contact with sections of the bottom and top runs 30, 32 respectively, of the belts 12, 14 so that heat generated by the platens 26, 28 is transferred to those heated sections 34, 36, respectively, of the bottom and top runs 30, 32. The upper and lower heating platens 26, 28 are disposed in an offset relationship such that the lower platen 28 is located underneath and to the left of the upper platen 26. By virtue of the counter-rotation of the belts 12, 14, the bottom and top runs 30, 32 co-operate to convey food being cooked in a left to right direction.

The lower belt 14 is mounted to the frame 16 slightly to the left of where the upper belt 12 is mounted to the frame 16 so that the top run 32 of the lower belt 34 extends to the left side of the upper belt 12 by a distance necessary to provide a dispensing platform portion 38 of the top run 32 of the lower belt 14 onto which food to be cooked, such as, in this embodiment, batter 40 for the cooking of pancakes, is dispensed. The dispensing platform portion 38 is part of the heated section 36 of the top run 32 of the lower belt 14 and so batter 40 dispensed thereon is immediately exposed to heat from the platen 28 conducted through the dispensing platform portion 38 of the top run 32 to start the cooking process.

Mounted to the frame 16 substantially over the dispensing platform portion 38 is a peristaltic pump 42 with flexible inlet tube portion 44 and flexible outlet tube portion 46. Batter 40, prepared by mixing in a stationery bowl 48 of an orbital mixer device 50, is fed in predetermined amounts through pump inlet tube portion 44 by the action of the peristaltic pump 42 to pump outlet tube portion 46 before the pumped amounts of batter 40 are deposited according to a predetermined timing sequence onto the dispensing platform portion 38.

Figure 2:
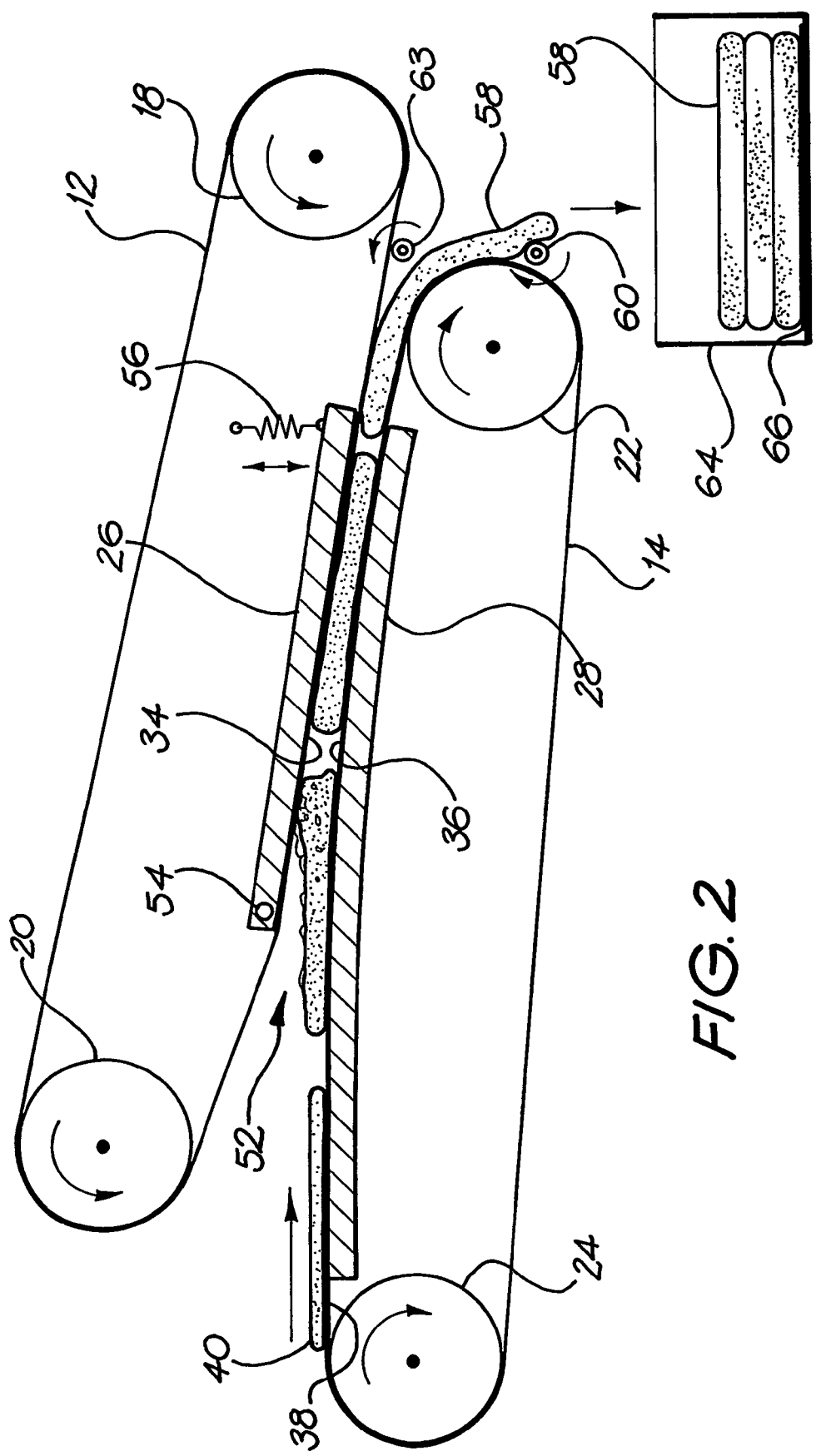
FIG. 2 is an isolated, schematic front view of the arrangement of upper and lower belts, platens and antirollers of the machine of FIG. 1 showing food at various stages of being cooked and being released therefrom.
Figure 3:
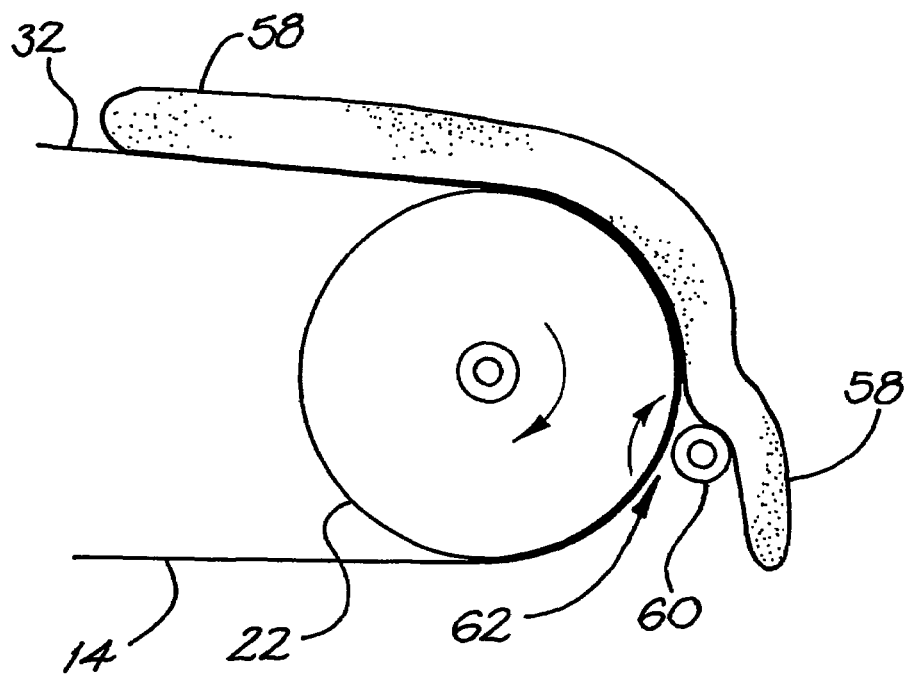
FIG. 3 is a schematic front view of the downstream end of the lower belt and adjacent antiroller showing a cooked food product being peeled off the lower belt.

As particularly shown in FIG. 2, the dispensed batter 40 is conveyed on the top run 32 of the lower belt 14 towards a mouth 52 formed to receive the batter 40 between the bottom and top runs 30, 32 by their convergence upstream of the mouth 52. The convergence of the bottom and top runs 30, 32 is caused by the inclined mounting position of the upper belt 12 with respect to the mounting position of the lower belt 14, and by the mounting locations of the platens 26, 28 pressing against their respective belt runs 30, 32, resulting in a wedging effect as the batter 40 is conveyed on the top run 32 towards the mouth 52 and thereafter sandwiched between the bottom and top runs 30, 32 to a downstream end of the lower belt 14.

As the batter 40 is being conveyed on the top run 32 towards the mouth 52, its continual exposure to heat from the platen 28 conducted through the top run 32 continues the cooking process and the batter 40 gradually expands, causing gas filled bubbles to be formed on the exposed surfaces of the batter 40. A significant number of these bubbles burst releasing the trapped gas before the partially cooked batter 40 reaches the mouth 52 and is then sandwiched between the bottom and top runs 30, 32. The provision for the gradual and peaceful release of gases trapped in bubbles produced by heating the batter 40 before the batter 40 becomes sandwiched between the belts 12, 14 avoids the problem of a significant number of bubbles bursting or erupting out of the sides of the batter 40 whilst the batter 40 is so sandwiched, the result of which would be to disrupt the interior and surface structure of the pancake.

The batter 40 is exposed to heat from both of the platens 26, 28 whilst it is sandwiched between the belts 12, 14, thereby continuing the cooking process and the gradual expansion of the batter 40.

The platen 26 is pivotally mounted to the frame 16 by a shaft 54 that is located adjacent the mouth 52, and there is a balancing spring 56 fixed at a first end thereof to the frame 16 and at a second end thereof to the pivoting end of the platen 26. Also, the position of the pivotal shaft 54 can be adjusted manually up or down. The distance between the platens 26, 28 downstream of the mounting shaft 54 is thus able to vary upwardly and downwardly by pivotal movement of the platen 26 to accommodate the expansion in size (particularly height) of the batter 40 and to accommodate a variety of differently sized food being cooked. This pivotal mounting arrangement can accommodate some variation of thickness and expansion of the batter (for example, due to the different viscosity/size), however, for the purpose of providing for a different mix or product, a manual adjustment of the pivot height position is provided.

The outward pressure against the platens 26 and 28 caused by expansion of the batter 40 enhances heat transfer through the belts 12, 14, with minimal loss of heat that might otherwise predominantly be caused by the forming and bursting of bubbles on the batter surface. Also, the pressure improves the contact between the belts and platens, therefore increasing the heat transfer efficiency.

The batter 40 is fully cooked into a pancake 58 by the time it exits from between the platens 26, 28 at the downstream end of the belt 14.

In order to further ensure that the pancakes 58 not, as might occasionally occur in prior art automated belt cooking machines, stick to the belt 14 when it is desired that they be released from the downstream end, there is provided an antiroller or separation roller 60 mounted to the frame 16 adjacent the driven roller 22 and adapted to rotate in the same direction as the belt 14 so that the pancakes 58 are peeled off the belt 14 by the rotation of the antiroller 60. The antiroller 60 has a surface linear speed that is very similar (if not identical) to that of the belt 14 so that the antiroller 60 serves, in effect, as an extension of the belt 14 as it winds around the driven roller 22. The diameter of the antiroller 60 is preferably about 0.5 to 3 times the thickness of the pancake 58 and there is a small gap 62 of, say, 1 mm between the belt 14 and the antiroller 60, which gap 62 is sufficiently large to avoid contact therebetween but is sufficiently small to prevent the pancake 58 entering the gap 62. The surface of the antiroller 60 is, in this embodiment, fabricated of, or surface treated with, a suitable non-stick material. Although not shown, the rotation of the antiroller 60 may be achieved by a timing belt or directly through a drive belt or band from the driven roller 22 or a suitable gearing arrangement. There is also provided an antiroller or separation roller 63 mounted to the frame 16 adjacent the downstream end of the bottom run 30 of the belt 12 and adapted to rotate in the same direction as the belt 12 so that the pancakes 58 are assisted in peeling off the belt 12 by the rotation of the antiroller 63. The surface linear speed, diameter, gap size, surface characteristics, and motive mechanism of the antiroller 63 are similar (if not identical) to those for the antiroller 60.

When each pancake 58 peels off the belts 12, 14 by the action of the antirollers 60, 63, the pancake 58 falls into a tray 64 kept warm by a heating element 66, from which tray 64 the pancakes 58 may be retrieved.

The heating temperature of the platens 26, 28 and numerous other parameters that dictate the operation of the machine 10 are controlled by a control interface 68 and are monitored by a display panel 69. An extraction fan 70 located above the overlapping belts 12, 14 exhausts excess heat to atmosphere.

Figure 4:
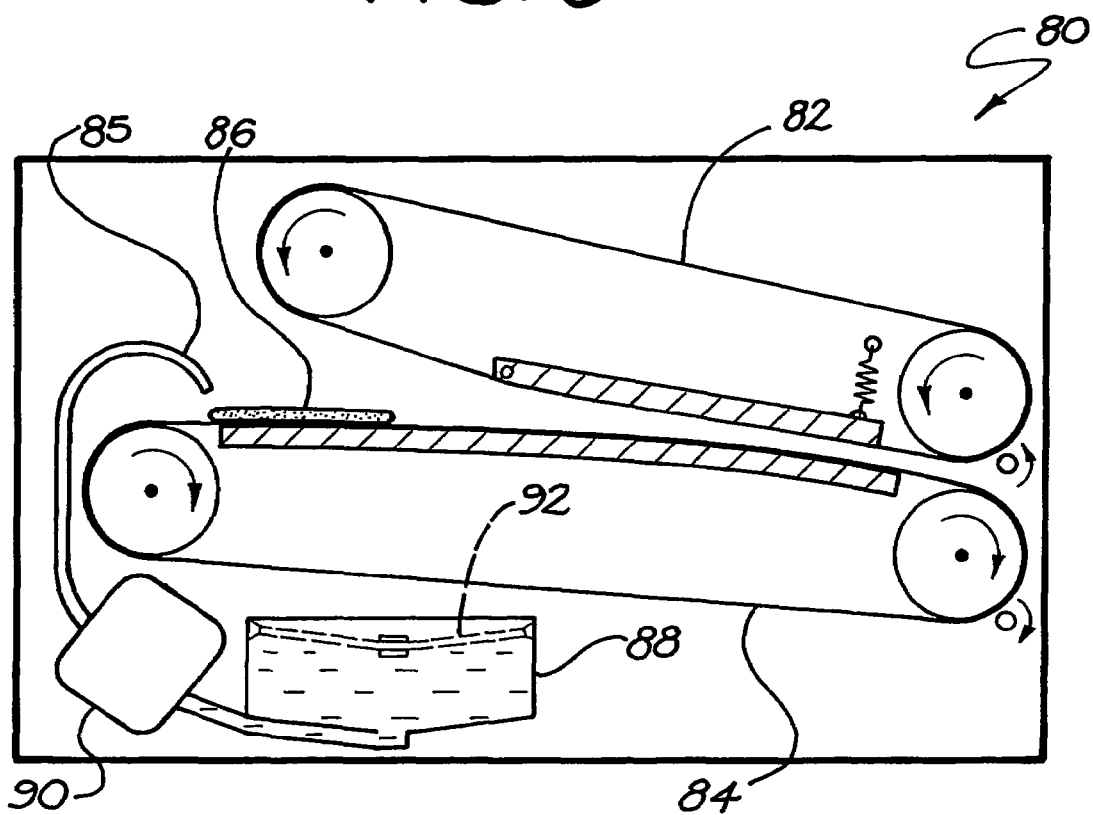
FIG. 4 is a schematic front view of an automated belt cooking machine according to a second preferred embodiment of the present invention.

Turning now to the automated belt cooking machine 80 shown in FIG. 4, unless otherwise indicated, the machine 80 has similar features to the features hereinbefore disclosed with respect to the machine of FIG. 1.

The upper belt 82 and lower belt 84 of the machine 80 are of different lengths, such that the downstream ends of both belts 82, 84 are generally aligned vertically, so as to minimize the size of the machine and avoid any wasteful overhang of the upper belt 82 with respect to the lower belt 84. Also, there is no mixer device 50 and no heated retrieval tray 64 in the machine 80, and the dispensing apparatus for the food is located substantially under the lower belt 84, with the dispensing outlet 85 therefor being located substantially over the dispensing platform portion.

The batter 86 is pumped from a fully enclosed and sealed, cylindrical container 88 of the dispensing apparatus for hygienic and pumping efficiency purposes. The vacuum action of a peristaltic pump 90 empties the container 88. A lid 92 for the container 88, sealed on its edges, gradually follows the batter down (due to the greater atmospheric pressure) towards the bottom of the container 88. The hygienic advantage is clear. In an open container, as opposed to the sealed container 88, during the process of pumping of thick batter, especially when the level is low, a funnel of air forms between the outlet of the open container and the surface of the batter (like a non spinning vortex). The air sucked into the outlet of such an open container decreases the volume of the batter delivered to the dispensing platform. This affects the precision of dosing, especially, when the measuring of doses is performed by means of pump timing or pump revolutions counting. The above mentioned arrangement of sealed container 88 and peristaltic pump 90 eliminates that problem, allowing the container 88 to be completely emptied so that almost 100% of the batter batch is used in forming the food.

Figure 5:
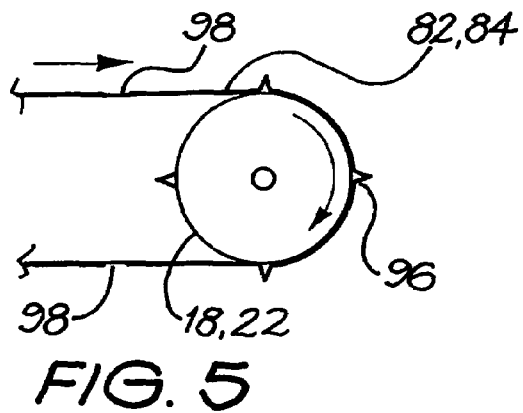
FIG. 5 is a schematic front view of the downstream end of either the upper belt or the lower belt showing a preferred belt tracking control and timing arrangement.
Figure 6:
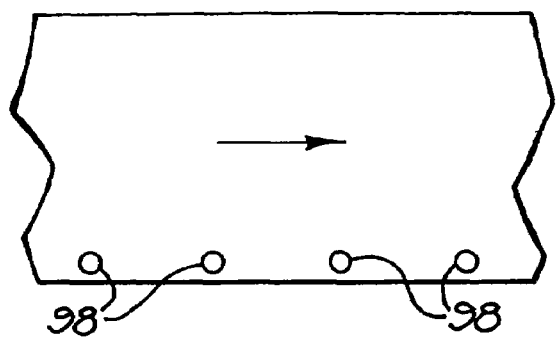
FIG. 6 is a plan view of a portion of a belt used in the belt tracking control and timing arrangement of FIG. 5.

The belt tracking control and timing arrangement shown in FIGS. 5 and 6 is provided by means of pins 96 mounted on the diameter edge of the driven rollers 18, 22, the pins 96 engaging within eyelets 98 formed on the belts 82, 84.

Figure 7:
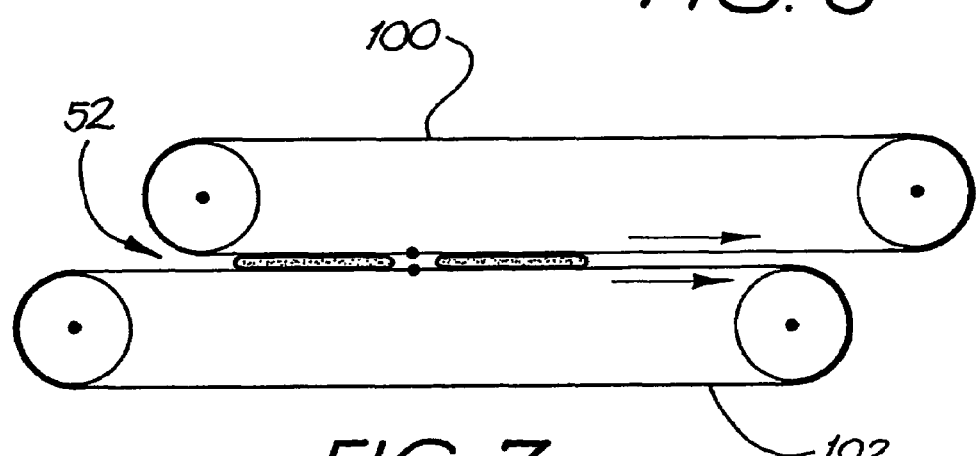
FIG. 7 is a schematic front view of an arrangement of upper and lower belts of an automated belt cooking machine similar to the machine shown in FIG. 1 showing an upper and lower belt joint arrangement.

In reference to the upper and lower belt joint arrangement shown in FIG. 7 for an automated belt cooking machine which is similar to that of FIG. 1, the belts 100, 102 are of the same length to eliminate the belt joint imprint on the surface of the pancake and to ensure correct timing of the belts for intentionally imprinting artwork or the like on the pancake. The overlapping joint on the belt transfers less heat, causing visible imperfection, and perhaps an undercooking of the batter, while slight variation in the thickness of the belt can be purposely used to create a desirable imprint on the pancake, say, by controlled discoloration of the surface. To achieve that, the belts 100, 102 are engaged in such a way that upper and lower belt joints are synchronised to enter the mouth 52 one directly above the other. A sensor (not shown) for detecting the lower belt joint ensures that no batter is applied on that joint and resets the timing for the batter application on the belt when required. Without the formerly mentioned synchronisation, the latterly mentioned sensing and avoidance of both joints would significantly increase the cycle time and disallow placing imprints on both faces of the pancake if the imprints are to be contained within the border of the pancake (eg. a smiley face), as opposed to another type of imprint, such as a background motif of random dots.

The ability to imprint artwork or the like on pancakes is an optional, but preferred, characteristic of the design and construction of the machine of the present invention.

The timing of the belts in this preferred machine is instrumental in its ability to produce high quality pancakes—to eliminate unintentional imprints of the belt joint, and also, to facilitate intentional imprints on the pancake. The imprints can be applied on one side, or on both sides, of the pancakes.

The technique involves altering the thickness of the belt, preferably the lower belt, in the shape of the desired artwork by a small fraction of a millimetre.

It can be achieved by various methods. The artwork can be applied by:—
(1) increasing the thickness of the belt;
(2) decreasing the thickness of the belt; or
(3) embossing the artwork on the belt.

One way in which the thickness of the belt can be increased is to provide a thin tape/film/foil (possible self-adhesive) or high temperature, durable paint which is affixed/painted to the belt, preferably on the non-cooking side (between the platen and the belt).

In a specific case, a self-adhesive TEFLON tape (thickness 0.05-0.09 mm) is attached underneath the upper run of the lower belt (thickness 0.16 mm).

The resulting effect is a discoloration of a dual nature. Firstly, the greater heat transferring distance leads to a lighter color of the surface of the pancake in that area. Secondly, the edge of the artwork underneath the upper run of the lower belt creates a small pocket of air. The air, as a poor heat conductor, in effect causes bright silhouette around the artwork.

One way in which the thickness of the belt can be decreased is by etching or 'engraving' the surface of the belt, preferably the under surface of the belt. The upper surface of the belt may also be etched or engraved so long as the exposed surface remains non-stick.

The embossing of the artwork on the belt, if carried out, is preferably in the direction towards the cooked product. For the upper run of the lower belt, the embossed area is directed upwardly towards the pancake laying upon it.

Figure 9:
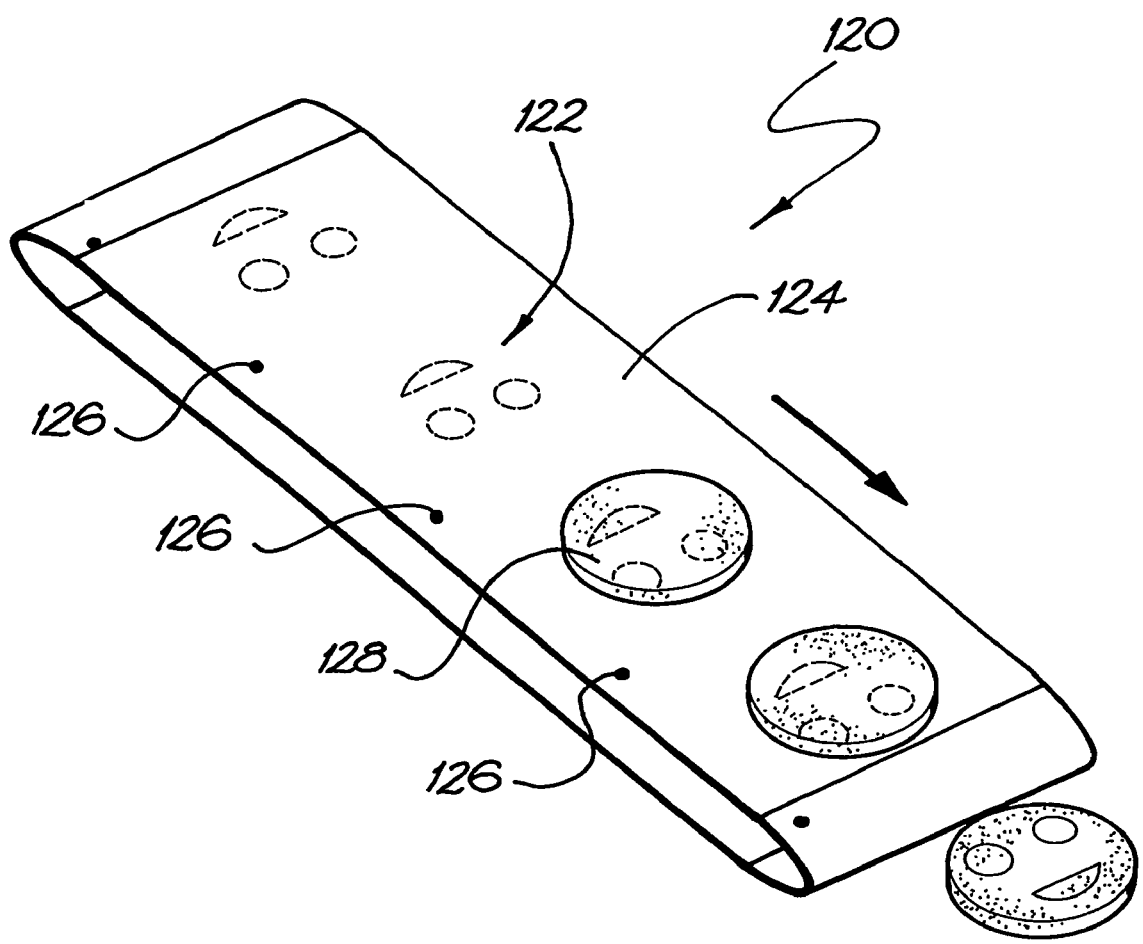
FIG. 9 is a perspective view of a lower belt used for imprinting artwork onto food being cooked by a preferred machine of the invention.

FIG. 9 shows a lower belt 120 in which artwork 122 in the form of a pattern of a smiley face is affixed underneath the top run 124 of the belt and is located between eyelets 126. The batter 128 is timed to be deposited upon the top run 124 between the eyelets 126 so that the batter covers the artwork 122. The compressive pressure experienced by the pancake causes the artwork to be imprinted upon its underside and the imprinted artwork on the pancake is revealed when the pancake is flipped over.

It is apparent that, just as the timing is used to avoid undesirable marking of the pancake by the joint, the timing can also be used to place an intentional image on the pancake by change of the thickness of the belt(s) within the space designated for the pancake. The imprint is not achieved by any additional, non-related operation, as for example, additional print head or stamping device.

This imprinting feature may be used to imprint promotional materials (ie logos, ads, trademarks, names, news, announcements etc), raising a esthetic appeal, and adding distinctive character for various occasions.

Figure 8:
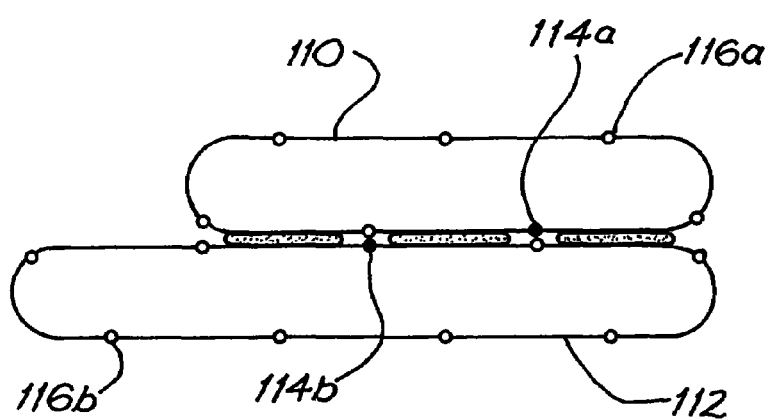
FIG. 8 is a schematic front view of an arrangement of upper and lower belts of an automated belt cooking machine similar to the machine shown in FIG. 4 showing another upper and lower belt joint arrangement.

In reference to the upper and lower belt joint arrangement shown in FIG. 8 for an automated belt cooking machine which is similar to that of FIG. 4, the belts 110, 112 have lengths which are a multiple of the distance designated for one pancake. In FIG. 8, the circles or dots shown along the length of both the upper and lower belts 110, 112 represent two features. The filled dots 114a, 114b (there is one only for each of belts 110, 112) represent the actual joint position, whereas the empty dots 116a, 116b represent a potential upper belt joint alignment position. The relative positions of the filled dots 114a, 114b (between the upper and lower belts 110, 112) change with each rotation or revolution of the belts, but only to the extent that the filled dot 114a of the upper belt 110 always aligns with either the filled dot 114b or any one of the empty dots 116b of the lower belt 112, and that the filled dot 114b of the lower belt 112 always aligns with either the filled dot 114a or any one of the empty dots 116a of the upper belt 110. The length between each adjacent pair of dots 114, 116 along each belt 110, 112 is always the same, and is greater than the length of a pancake when conveyed between the belts 110, 112. As in the case of two geared wheels of different diameter, the dots 114, 116 along the belt circumferences will always engage, even though they "swap the partners" at each rotation. Furthermore, in this arrangement, the length or distance designated for a pancake is equal to the circumference of the roller for the belt, i.e. (approx) roller diameter=50 mm, circumference (maximum pancake length or diameter)=157 mm. This allows for relatively simple control of the batter dispensing. After initial alignment of the belts and the rollers, a sensor switch (not shown) senses one point on the side of the roller in order to pump the mix. Each turn of the roller triggers the dosing of the batter. Also, the size of the pancake (determined by the duration of pumping) can be regulated by a simple adjustable cam (not shown). In this arrangement, the two driven, front rollers are engaged by two geared wheels at the end of the rollers.

Various modifications may be made in details of design and construction without departing from the scope and ambit of the invention.

The invention claimed is:

1. An automated belt cooking machine for preparing batter based food products comprising:
upper and lower overlapping, thermally conductive belts, said belts being counter-rotatably mounted to a frame for said machine so that, in use, a bottom run of said upper belt and a top run of said lower belt co-operate to convey batter based cooking materials to be cooked into said food products between said upper and lower belts, said lower belt extending a predetermined distance to one side of said upper belt so as to provide a dispensing platform portion of said top run of said lower belt for dispensing thereon said materials to be cooked, so that, in use, said materials are conveyed in a direction towards a mouth formed between said bottom run of the upper belt and said top run of the lower belt to receive said materials and thereafter are conveyed sandwiched between said bottom run and said top run to a downstream end of said lower belt, upper and lower heating platens mounted to said frame and in thermal contact with said bottom run of the upper belt and said top run of the lower belt, respectively, the lower heating platen extending to beneath and being in thermal contact with the dispensing platform portion of said top run of said lower belt, so that the batter based cooking materials dispensed on the dispensing platform portion are immediately exposed to heat from the lower heating platen of the top run, wherein the lower heating platen is convexly curved to provide a progressively decreasing gap between the bottom run of the upper belt and the top run of the lower belt from the mouth to a downstream end of the lower belt, wherein said materials to be cooked are initially exposed to heat from said lower platen conducted firstly through said dispensing platform portion of said top run and then continually through the remaining portion of said top run toward said mouth so as to cause said materials to gradually expand and allow the release of gases trapped in bubbles produced by heating said materials before said materials are sandwiched between said bottom run and said top run, and said materials to be cooked are then exposed to heat from said upper platen conducted through said bottom run as well as from said lower platen conducted through said top run for continuing to gradually expand said material and to apply outward pressure against the upper and lower platens and to increase the contact between the bottom run and the upper platen and between the top run and the lower platen as the materials are being conveyed through the progressively decreasing gap between the bottom and top runs, whereby heat transfer is increased to the said materials from the mouth to the downstream end of the lower belt so as to cook said batter based cooking materials.

2. The automated belt cooking machine of claim 1 wherein said machine includes a dispensing apparatus for said materials having a dispensing outlet located over said dispensing platform portion.

3. The automated belt cooking machine of claim 1 wherein said bottom run of the upper belt and said top run of the lower belt converge towards said mouth formed between said bottom and top runs to receive said materials.

4. The automated belt cooking machine of claim 1 wherein said upper platen is pivotally mounted to said frame so as to allow for adjustment or variation in the distance between said lower and upper platens to accommodate different thicknesses and expansion of said materials being cooked.

5. The automated belt cooking machine of claim 4 wherein said upper platen is pivotally mounted adjacent said mouth.

6. The automated belt cooking machine of claim 5 wherein said upper platen is subject to a pivotal bias for retaining a predetermined distance between said upper and lower platens provided by a spring means.

7. The automated belt cooking machine of claim 1 wherein said machine includes a lower antiroller mounted to said frame adjacent said downstream end of said lower belt, said lower antiroller and said lower belt being adapted to rotate in the same direction so that, in use, said batter based food products are peeled off said lower belt by the rotation of said lower antiroller.

8. The automated belt cooking machine of claim 7 wherein said machine includes an upper antiroller mounted to said frame adjacent said downstream end of said upper belt, said upper antiroller and said upper belt being adapted to rotate in the same direction so that, in use, said batter based food products are peeled off said upper belt by the rotation of said upper antiroller.

9. The automated belt cooking machine of claim 1 wherein said lower belt includes at least one region of variable thickness defining artwork to be imprinted on said food when said materials are conveyed sandwiched between said bottom run and said top run.

10. The automated belt cooking machine of claim 1 wherein the batter based food products include pancakes.

* * * * *